United States Patent [19]

Vroomans

[11] 4,308,198

[45] Dec. 29, 1981

[54] THERMOPLASTIC FIRE RETARDANT COMPOSITION

[75] Inventor: Hubertus J. Vroomans, Beek, Netherlands

[73] Assignee: Stamicarbon, B.V., Geleen, Netherlands

[21] Appl. No.: 154,897

[22] Filed: May 30, 1980

[30] Foreign Application Priority Data

Jun. 27, 1979 [NL] Netherlands ......................... 7904991
Oct. 17, 1979 [NL] Netherlands ......................... 7907650

[51] Int. Cl.$^3$ .............................................. C08K 3/24
[52] U.S. Cl. ..................... 260/45.75 F; 260/45.75 W; 260/42.49
[58] Field of Search .................... 260/42.49, 45.75 W, 260/45.75 F, 45.75 P

[56] References Cited

U.S. PATENT DOCUMENTS 3,901,850 8/1975 Kurtz .......................... 260/45.75 W
3,928,502 12/1975 Fabris et al. .................. 260/45.75 B

OTHER PUBLICATIONS

J. Am. Ceramic Soc. 44, pp. 493–499, Oct. 1961.

*Primary Examiner*—V. P. Hoke
*Attorney, Agent, or Firm*—Cushman, Darby & Cushman

[57] ABSTRACT

An improved thermoplastic moulding composition with enhanced fire-resistant characteristics, composed of vinylchloride polymers and a graft copolymer of a vinyl aromatic and a nitrile monomer on a synthetic rubber-like polymer together with a zinc-titanium (IV) oxide compound, added as fire retardant.

9 Claims, No Drawings

THERMOPLASTIC FIRE RETARDANT COMPOSITION

This invention relates to a thermoplastic moulding composition of reduced combustibility composed of one or more vinylchloride polymers and a graft copolymer of a vinyl aromatic compound and a nitrile monomer on a synthetic rubber-like polymer.

Mixtures of vinylchloride polymers, such as PVC and graft copolymers of a vinylaromatic compound and a nitrile on a synthetic rubber, such as ABS, sometimes with an additional quantity of a copolymer of a vinylaromatic compound and a nitrile, are already known from, inter alia, the British Pat. No. 841,889.

Objects made from such mixtures have an exceptionally high impact resistance and rigidity, as compared to the starting materials (ABS and PVC), while these mixtures, as such, already have a certain degree of fire resistance.

However, to meet the stringent fire resistance specifications for certain plastic applications, it is necessary to add an extra fireproofing agent in many cases. The best known such agent is antimony trioxide. However, the disadvantages of this approach is that the proportionately large quantities of fireproofing agent which are required have a negative effect on the impact resistance of the product.

The object of this invention is to provide a thermoplastic moulding compound of reduced combustibility based on ABS and PVC but requiring minimum quantities of fireproofing agent, and of such a composition that the mechanical properties are not, or hardly at all, affected by the addition of the fireproofing agent.

According to this invention, such a composition is characterized by the components:

A. 20–80 parts by weight of vinylchloride polymer;
B. 80–20 parts by weight of a mixture of
  B-1. 30–100 wt. % of graft copolymer obtained by
    B-1-1. polymerization of a monomer mixture of from 0 to 75 wt. % of acrylonitrile and/or methacrylonitrile, and 100–25 wt. % of styrene and/or α-methyl styrene, in the presence of a
    B-1-2. synthetic rubber-like polymer, the weight ratio between the monomer mixture and the rubber-like polymer being between 1:10 and 10:1, and
  B-2. from 0 to 70 wt. % of a polymer obtained by polymerization of
    B-2-1. from 0 to 75 wt. % of acrylonitrile and/or mechacrylonitrile, with
    B-2-2. from 100 to 25 wt. % of styrene and/or α-methyl styrene; with from
C. 0.05 to 5 parts by wt., relative to 100 parts by wt. of (A+B), of a member selected from the class of zinc-titanium (IV) oxide or a mixture of zinc-oxide and titanium (IV) oxide.

The component C is preferably zinc-titanium (IV) oxide. This is a zinc-titaniumoxide compound which generally contains some residual free zinc oxide. Such compound is normally prepared by reacting two parts of zinc oxide with one part of titanium oxide. Although the addition of a zinc-titanium (IV) oxide, thus prepared, to ABS/PVC mixtures as a fireproofing agent gives products with good fire resistance properties, problems may still arise in processing, especially at higher temperatures, with unsatisfactory stability of the end product.

Preferably therefore, a zinc-titanium (IV) oxide is used having a molar zinc-titanium ratio of between 0.5 and 2.5, or more particularly a zinc-titanium oxide is used which contains a maximum of 5% by wt. of free zinc oxide.

Even more particularly, a zinc-titanate (i.e., a zinc-titanium (IV) oxide) is used which consists to a large extent, preferably more than 50 wt. % and most preferably more than 75 wt. %, of zinc titanate possessing the spinel crystalline structure.

The spinel structure has a cubic lattice. Various modifications are known, such as normal and inverse spinels and spinels with vacant lattice places. As employed here, the term spinel structure includes both the spinel structure itself and those usual modifications thereof.

Such zinc titanate compounds can readily be prepared by a method known per se, i.e., by heating together intimate mixtures of zinc oxide and titanium dioxide. Various zinc titanates are known, with various zinc:titanium ratios. The particular zinc titanate which is substantially formed is, to a significant extent, dependent on the molecular ratio of zinc and titanium in the starting mixture and may additionally also depend on the temperature at which it is heated. In addition to one or more zinc titanates, the reaction product may also still contain some unconverted zinc oxide or some titanium dioxide or, in the case of incomplete conversion, some of both oxides.

Examples of zinc titanates with a spinel structure are $Zn_2TiO_4$ and $Zn_2Ti_3O_8$. In one embodiment according to this invention, preference is given to $Zn_2Ti_3O_8$ due to the favorable effect thereof on the thermal stability of the vinyl chloride polymer compositions to be formed. And, for this reason, zinc titanate is preferably used which contains more than 50 wt. %, and most preferably more than 75 wt. %, of $Zn_2Ti_3O_8$.

Mention may also be made of the fact that the crystal structure of the zinc titanates specified above is known from Structure Reports Vol. 26, pages 376 and 377 (1961). NV. Oosthoek's Ultgeveramij, Utrecht, Netherlands.

The quantity of component C employed in the above composition may be very minor. The actual optimum quantity used is, however, dependent on the exact composition of the moulding composition and can readily be assessed by a few simple tests by one trained in the art. In one preferred embodiment 0.1 to 3.5 parts by wt. of component C, relative to 100 parts by wt. of (A+B), are used, or even more specifically 0.2 to 2.0 parts by wt. of component C.

Optionally, an iron or antimony compound, more specifically an oxide of at least one of these metals, may also be added to the flame retarder component.

This iron compound may be added in the form of a compound with zinc titanium (IV) oxide such as (zinc-iron-titanium) oxide, or in the form of a ferric-ferrocyanide, ferrous ferricyanide or ferrocene.

It is particularly surprising that the moulding compounds prepared according to this invention, in which very minor quantities of flame retardant are incorporated as compared to the flame retardants that have up to now usually been employed, have such excellent flame-extinguishing properties. It has been found, for instance, that the oxygen index of the ABS/PVC mixtures is raised from a level of approximately 22 up to 34 and even higher by the addition of flame retardant component C. In the test as per UL 94, V-O can be achieved at 1.6 mm.

The vinyl chloride polymer preferably employed is polyvinyl chloride. For certain applications it may alternatively be advantageous to employ copolymers of vinyl chloride containing up to 30 mole % of one or more monomers copolymerizable with vinyl chloride. Such co-monomers copolymerizable in vinyl chloride copolymers include alkenes having from 2 to 12 carbon atoms, such as ethylene, propylene, butylene, isobutylene, etc., and also dienes such as butadiene or isoprene, for example. Vinyl chloride may also be copolymerized with vinyl lower alkanate esters and allyl esters, such as vinyl acetate, vinyl chloroacetate, vinyl propionate, vinyl butyrate, allyl acetate, etc., or with aromatic vinyl compounds, e.g., styrene, α-methyl styrene, chlorostyrene, vinyl toluene. Other monomers copolymerizable with vinyl chloride, include vinylidene chloride, maleic acid esters, etc. Vinyl chloride may also be graft polymerized onto a polymer base such as ethylene, propylene co- or terpolymers, ethylene-vinylacetate copolymers, etc.

In view of the chlorine content generally desired for the eventual moulding compound, preference is given to a minimum of 70 wt. % vinyl chloride being present in the copolymers in order to obtain the required flamability characteristics.

The synthetic rubber-like polymer employed as the graft base for styrene and acrylonitrile is preferably a butadiene rubber such as polybutadiene, SBR and/or BAN, but other rubbers such as acrylate rubber of EPDM may also be employed. Any synthetic rubber to which said monomers can be grafted is in principle suitable.

Styrene and acrylonitrile are frequently employed as graft monomers. To obtain a grade with superior heat resistance, α-methyl styrene may also be employed instead of styrene.

In addition, the composition also contains the usual additives, such as stabilizers, lubricants, pigments and the like.

More particularly, a copolymer of ethyl acrylate and methyl methacrylate can now be employed as the lubricant, without the flamability characteristics being significantly affected. This is very surprising, because these compounds generally have an extremely adverse effect on the properties of the final product.

The invention will be further understood by reference to the following non-limiting examples. In these examples all parts and percentages are given by weight, unless otherwise indicated.

EXAMPLES I-V AND COMPARATIVE EXAMPLE A

From a mixture of 30 parts of ABS and 70 parts of PVC and containing the usual lubricants and stabilizers, test bars were made with different percentages of zinc-titanium (IV) oxide, which contained about 3 wt. % of free zinc oxide. The molar zinc-titanium ratio of this zinc-titanium (IV) oxide was 1.1. The crystal structure of the zinc-titanate was a spinel structure.

The Table shows the results of the determination of the oxygen index and the fire characteristics according to UL-94, using bars of thicknesses of 3.2 and 1.6 mm.

TABLE 1

| Example | Zinc-Titanium (IV) Oxide, % By Wt. | LOI* | UL-94** 3.2 mm | 1.6 mm |
|---|---|---|---|---|
| I | 0.4 | 31 | V-0 | V-0 |
| II | 0.6 | 32 | V-0 | V-0 |
| III | 0.8 | 33 | V-0 | V-0 |
| IV | 1.0 | 33 | V-0 | V-0 |
| V | 1.2 | 33 | V-0 | V-0 |
| A | 0 | 26 | V-1 | V-1 |

*Oxygen index according to ASTM-D2863.
**Vertical fire test according to Underwriters Laboratories (UL-94).

EXAMPLES VI THROUGH XI

From a mixture of 70 parts of PVC, 30 parts of ABS and 2 parts of lubricant(ethylacrylate-methylmethacrylate copolymer), test bars were made with different weight percentages of zinc-titanium (IV) oxide (relative to the total mixture), and which contained about 3% by weight of free zinc oxide. The zinc titanate had a spinel crystal structure.

Analogously to the Examples I–V, the oxygen index and the combustibility of these test bars were determined.

TABLE 2

| Example | Zinc-Titanium (IV) Oxide, | LOI* | UL-94** 3.2 mm | 1.6 mm |
|---|---|---|---|---|
| VI | 0.66 | 29 | V-0 | V-0 |
| VII | 1.33 | 29 | V-0 | V-0 |
| VIII | 1.66 | 29.5 | V-0 | V-0 |
| IX | 2.00 | 30 | V-0 | V-0 |
| X | 2.66 | 31 | V-0 | V-0 |
| XI | 3.33 | 31 | V-0 | V-0 |

*Oxygen index according to ASTM-D2863.
**Vertical fire test according to Underwriters Laboratories (UL-94).

EXAMPLES XII THROUGH XVII, AND COMPARATIVE EXAMPLE B

From a mixture of 50 parts of PVC and 50 parts of ABS and 2 parts of lubricant (ethylacrylate-methacrylate copolymer) test bars were made with different weight percentages of zinc-titanium (IV) oxide (relative to the total mixture), and which contained about 3% by weight of free zinc oxide. Analogously to the Examples I-XI, the oxygen index of these test bars were determined. The crystal structure of the zinc-titanium (IV) oxide was: spinel

TABLE 3

| Example | Zinc-Titanium (IV) Oxide, % By Wt. | LOI* |
|---|---|---|
| XII | 0.66 | 25 |
| XIII | 1.33 | 25.5 |
| XIV | 1.66 | 26 |
| XV | 2.00 | 25.5 |
| XVI | 2.66 | 25.5 |
| XVII | 3.33 | 27 |
| B | 0 | 22.5 |

*Oxygen index according to ASTM-D2863.

EXAMPLES XVIII THROUGH XXII

From a mixture of 50 parts of ABS and 50 parts of PVC, test bars were made using zinc-titanium (IV) oxide containing 12% by weight of free zinc oxide and having a molar zinc-titanium ratio of 1.3. The zinc-titanium (IV) oxide had a spinel structure.

TABLE 4

| Example | Zinc-Titanium (IV) Oxide | UL-94** LOI* | 3.2 mm | 1.6 mm |
|---------|--------------------------|--------------|--------|--------|
| XVIII   | 0.2                      | 25           | V-1    | (1)    |
| XIX     | 0.3                      | 26           | V-1    | (1)    |
| XX      | 0.4                      | 26           | V-1    | V-1    |
| XXI     | 0.5                      | 26.5         | V-1    | V-1    |
| XXII    | 0.6                      | 26.5         | V-0    | V-1    |

*Oxygen index according to ASTM-D2863.
**Vertical fire test according to Underwriters Laboratories (UL-94).
(1) Means that the test bar is fully combusted.

EXAMPLES XXIII AND XXIV

From a mixture of 50 parts of ABS and 50 parts of PVC, test bars were made containing (zinc-iron-titanium) oxide and bars containing zinc-titanium (IV) oxide with ferric oxide. The results are shown in Table 5.

TABLE 5

| Example | Fire-Proofing Agent | % | LOI* | UL-94** 3.2 mm | 1.6 mm |
|---------|--------------------|----|------|----------------|--------|
| XXIII   | (Zinc-iron-titanium) oxide | 0.5 | 34 | V-0 | V-1 |
| XXIV    | Zinc-titanium (IV) Oxide | 0.6 | 33 | V-0 | V-0 |
|         | Ferric Oxide       | 0.2 |      |                |        |

*Oxygen index according to ASTM-D2863.
**Vertical fire test according to Underwriters Laboratories (UL-94).

EXAMPLE XXV

Test bars were made of a mixture of 50 parts ABS and 50 parts PVC containing 0.4% of a zinc-titanate having an ilmenite structure. The oxygen index was 25, and the ratings according to UL 94 were V-1 for 3.2 mm, whereas the testbar of 1.6 mm was fully combusted.

EXAMPLES XXVI AND XXVII, AND COMPARATIVE EXAMPLE C

Of a mixture of 70 parts PVC and 30 parts ABS some mechanical properties were determined (impact resistance, hardness, E-modulus) (Example C). Of the same mixture, containing 0.5 and 1.0% of the zinc-titanate of Example I (Examples XXVI and XXVII) the same properties were determined. Within the error of measurement, no differences were observed.

What is claimed is:

1. An improved flame-resistant thermoplastic moulding composition composed of at least one vinylchloride polymer and grafted copolymers of a vinyl aromatic compound and a nitrile on a rubber-like polymer, said composition having the following components:
    A. 20 to 80 parts by weight of vinylchloride polymer;
    B. 80 to 20 parts by weight of a mixture of
    B-1. 30 wt. % to 100 wt. % of a grafted copolymer obtained by
    B-1-1. polymerization of a monomer mixture of up to 0 wt. % to 70 wt. % of acrylonitrile and/or methacrylonitrile, and 100 wt. % to 25 wt. % of styrene and/or α-methylstyrene in the presence of
    B-1-2. a synthetic rubber-like polymer, the weight ratio between the monomer mixture and the rubber-like polymer being between 1:10 and 10:1; and
    B-2. 0 to 70 wt. % of a copolymer obtained by polymerization of a mixture of
    B-2-2. 0 wt. % to 75 wt. % of acrylonitrile and/or methacrylonitrile, and
    B-2-2. 100 wt. % to 25 wt. % of styrene and/or α-methylstyrene; and with
    C. 0.05 parts to 5 parts by wt. relative to 100 parts by wt. of (A+B) of a zinc titanate, wherein the zinc titanate consists of at least 50% by weight of zinc titanate having the spinel structure, and selected from the class of zinc titanium (IV) oxide or a mixture of zinc oxide and titanium (IV) oxide compounds.
2. A moulding composition according to claim 1, wherein the zinc-titanium (IV) oxide used contains at most about 5 wt. % of free zinc oxide.
3. A moulding composition according to claim 2, wherein the zinc-titanium (IV) oxide used has a molar Zn:Ti (IV) ratio of between 0.5 and 2.5.
4. A moulding composition according to claim 1, wherein said zinc-titanate consists substantially of zinc titanate possessing the spinel crystal structure.
5. A moulding composition according to claim 1, wherein said composition contains from 0.1 to 2 parts by weight of said zinc titanate per 100 parts by weight of (A+B).
6. A moulding composition according to claim 1 or 4, wherein said zinc titanate contains more than 75 wt. % of zinc titanate having a spinel crystal structure.
7. A moulding composition according to claim 1 or 4, wherein said zinc titanate consists substantially of $Zn_2Ti_3O_8$.
8. A moulding composition according to claim 1, wherein said component C also contains an iron compound.
9. A moulding composition according to claim 1, wherein said component C also contains an antimony compound.

* * * * *

UNITED STATES PATENT AND TRADEMARK OFFICE
CERTIFICATE OF CORRECTION

PATENT NO. : 4,308,198
DATED : December 29, 1981
INVENTOR(S) : Hubertus J. VROOMANS It is certified that error appears in the above—identified patent and that said Letters Patent are hereby corrected as shown below:

Col. 6, line 9, "70 wt. %" should read --75 wt. %--.

Col. 6, line 17, "B-2-2" should read --B-2-1--.

Signed and Sealed this

Fourth Day of May 1982

[SEAL]

Attest:

GERALD J. MOSSINGHOFF

Attesting Officer   Commissioner of Patents and Trademarks